(12) United States Patent
Cress et al.

(10) Patent No.: US 6,526,470 B1
(45) Date of Patent: Feb. 25, 2003

(54) FIFO BUS-SIZING, BUS-MATCHING DATAPATH ARCHITECTURE

(75) Inventors: Daniel Eric Cress, Starkville, MS (US); Pidugu L. Narayana, Sunnyvale, CA (US); Sangeeta Thakur, Sunnyvale, CA (US)

(73) Assignee: Cypress Semiconductor Corp., San Jose, CA (US)

( * ) Notice: Subject to any disclaimer, the term of this patent is extended or adjusted under 35 U.S.C. 154(b) by 0 days.

(21) Appl. No.: 09/398,736

(22) Filed: Sep. 17, 1999

Related U.S. Application Data

(60) Provisional application No. 60/102,035, filed on Sep. 28, 1998.

(51) Int. Cl.$^7$ ................................................. G06F 13/00
(52) U.S. Cl. ............................................. 710/307; 710/100
(58) Field of Search .................................. 710/100, 305, 710/310, 316, 317, 307

(56) References Cited

U.S. PATENT DOCUMENTS

| | | | | |
|---|---|---|---|---|
| 4,532,433 A | * | 7/1985 | Basile | 327/417 |
| 4,571,706 A | * | 2/1986 | Iwahashi et al. | 365/200 |
| 5,255,226 A | * | 10/1993 | Ohno et al. | 365/189.12 |
| 5,265,224 A | * | 11/1993 | Maruno | 706/20 |
| 5,453,990 A | * | 9/1995 | Aoki et al. | 714/712 |
| 5,631,902 A | * | 5/1997 | Yoshifuji | 340/2.24 |
| 5,764,967 A | | 6/1998 | Knaack | 395/555 |
| 5,878,025 A | * | 3/1999 | Tomonaga et al. | 340/2.21 |
| 5,961,640 A | * | 10/1999 | Chambers et al. | 703/20 |
| 6,023,435 A | | 2/2000 | Narayana et al. | 365/203 |
| 6,173,425 B1 | * | 1/2001 | Knaack et al. | 714/718 |
| 6,275,091 B1 | * | 8/2001 | Saeki | 327/277 |
| 6,366,979 B1 | | 4/2002 | Narayana et al. | 711/109 |

* cited by examiner

Primary Examiner—Xuan M. Thai
(74) Attorney, Agent, or Firm—Christopher P. Maiorana, P.C.

(57) ABSTRACT

A circuit comprising (i) one or more input paths, (ii) one or more output paths, and (iii) one or more switch circuits. The switch circuits may be configured to connect one or more of said input paths to one or more of said output data in response to one or more control signals. The present invention may be used to read and/or write data in one or more modes of operation such as 9-Bit Big Endian Write, 9-bit Little Endian Write, 18-bit Big Endian Write, 18-bit Little Endian Write, a 36-bit Write, 9-Bit Big Endian Read, 9-bit Little Endian Read, 18-bit Big Endian Read, 18-bit Little Endian Read, 36-bit Read or other mode.

20 Claims, 2 Drawing Sheets

FIFO BUS-SIZING, BUS-MATCHING DATAPATH ARCHITECTURE

This application claims the benefit of U.S. Provisional Application No. 60/102,035, filed Sept. 28, 1998 and is hereby incorporated by reference in its entirety.

FIELD OF THE INVENTION

The present invention relates to memories generally and, more particularly, to a bus-matching datapath architecture that may be used for bus-sizing and/or bus-matching in a memory such as a FIFO.

BACKGROUND OF THE INVENTION

Bus matching generally refers to matching the data width of one device, such as an 9-bit input data bus, with the data width of another device, such as a 18-bit memory array. Various combinations of bus matching, such as between 9-bit, 18-bit and 36-bit devices, and byte swapping are desirable.

Previous approaches implement a bus-matching and multiplexing block in series and before the datapath. FIG. 1 illustrates such a conventional approach implemented for write-side multiplexing. Similar implementations are used for the read side.

Disadvantages with conventional approaches include the introduction of additional delays by the incorporation of one or more additional multiplexers in the datapath as well as an increased area for implementation the logic block.

SUMMARY OF THE INVENTION

The present invention concerns a circuit comprising (i) one or more input paths, (ii) one or more output paths, and (iii) one or more switch circuits. The switch circuits may be configured to connect one or more of said input paths to one or more of said output data paths in response to one or more control signals. The present invention may be used to read and/or write data in one or more modes of operation such as 9-Bit Big Endian Write, 9-bit Little Endian Write, 18-bit Big Endian Write, 18-bit Little Endian Write, a 36-bit Write, 9-Bit Big Endian Read, 9-bit Little Endian Read, 18-bit Big Endian Read, 18-bit Little Endian Read, 36-bit Read or other modes.

The objects, features and advantages of the present invention include providing a circuit and method for implementing a bus-matching datapath architecture that may be used for bus-sizing in a memory such as a FIFO that is (i) faster than conventional approaches by reducing the delay path from a data input to a memory and/or (ii) less complex and uses less area than conventional approaches by implementing existing datapath multiplexing logic to also implement the bus-matching logic. The present invention does not incur any extra delay, and minimizes the required logic area by utilizing the existing logic that is used to multiplex data into the memory. The present invention may be applicable to any FIFO memory that requires bus-matching and/or bus-sizing capability. The present invention may also be used to ease back-end testing by allowing a test engineer to test the entire memory using a 9-bit channel for the data input/output rather than 36 bit channels.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention provides a circuit and method for bus-matching, bus-sizing and/or byte swapping in a FIFO datapath. The following bus-sizing/bus-matching modes are some examples of bus sizes that may be accommodated with the present invention (i) 9-Bit Big Endian Write, (ii) 9-bit Little Endian Write, (iii) 18-bit Big Endian Write, (iv) 18-bit Little Endian Write, (v) 36-bit Write, (vi) 9-Bit Big Endian Read, (vii) 9-bit Little Endian Read, (viii) 18-bit Big Endian Read, (ix) 18-bit Little Endian Read, and (x) 36-bit Read. The present invention may also be implemented with other bus sizes to meet the design criteria of a particular application.

The present invention may be used for bus-matching that allows (i) data from one port (e.g., port A) to be written in one byte, two bytes, four bytes, or multiple bytes of varying width, (ii) data from port A to be written as multiple bytes in big-endian (e.g., most significant byte written first) or little-endian (e.g., least significant byte written first) mode, (iii) data that is written to port A to be read from a second port (e.g., port B) in one byte, two bytes, four bytes, or multiple bytes of varying width, (iv) data to be read in big endian mode or little endian mode.

Figure 1:
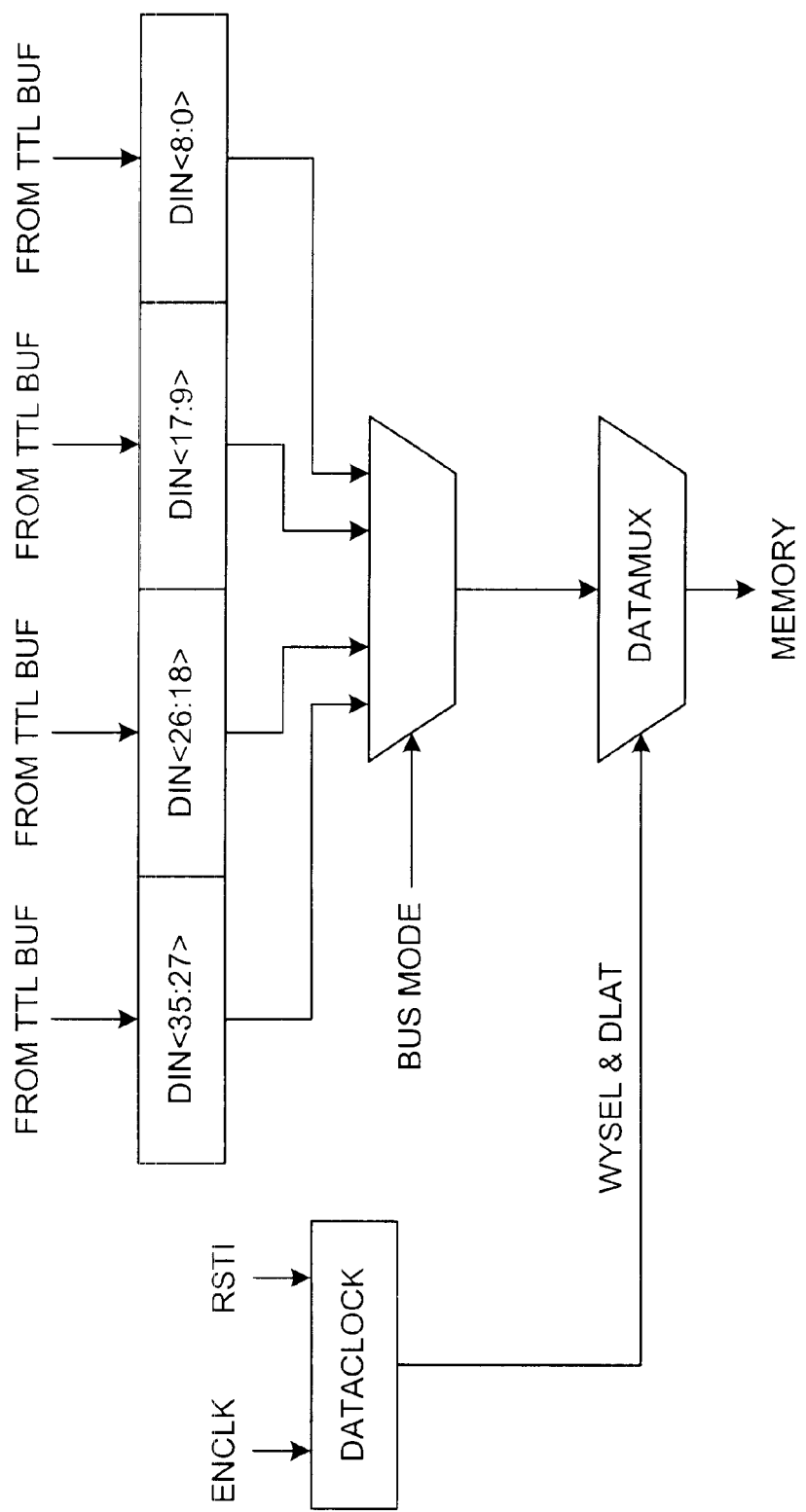
FIG. 1 is a diagram of a conventional approach to bus matching.
Figure 2:
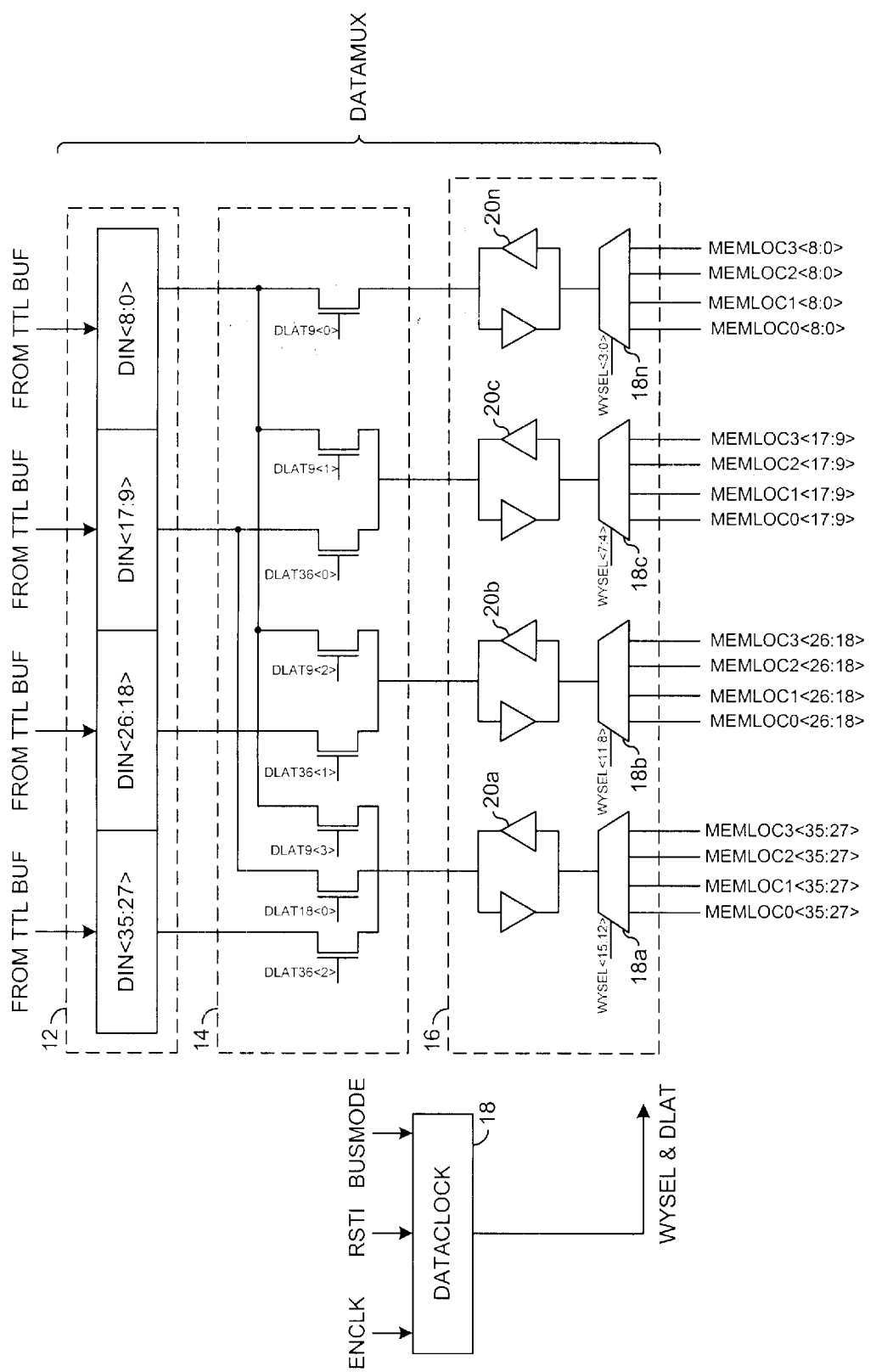
FIG. 2 is a block diagram of a preferred embodiment of the present invention.

Referring to FIG. 2, a block diagram of a circuit 10 is shown in accordance with a preferred embodiment of the present invention. The circuit 10 generally shows circuitry for write operations. A similar circuit (e.g., a dual) may be implemented for read operation. The circuit 10 generally comprises an input path 12, a switch section 14, an output path 16 and a logic section 18. The input path 12 and the output path 14 may be data paths in a memory device, such as a FIFO buffer.

The switch section 14 generally comprises a first number of transmission gates (e.g., Dlat9<0:3>), a second number of transmission gates (e.g., Dlat18<0>), and a third number of transmission gates (e.g., Dlat36<0:2>). Bus matching is generally achieved by turning on either the transmission gates Dlat36, Dlat18, or Dlat9 during operation to write/read the bytes of data to/from different locations in the memory device (not shown). While the switch section 14 is shown having transmission gates Dlat36, Dlat18, and Dlat9 to accommodate three bus sizes, additional transmission gates (e.g., Dlat0–N) may be implemented to accommodate additional bus sizes.

The output path 16 generally comprises a number of multiplexers 18a–18n. The multiplexer 18a generally presents information to a first memory location (e.g., Memloc0<35:27>), a second memory location (e.g., Memloc1<35:27>), a third memory location (e.g., Memloc2<35:27>), or a fourth memory location (e.g., Memloc3<35:27>) in response to a control signal (e.g., Wysel<15:12>). The multiplexers 18a–18n generally present similar information to respective memory locations in response to additional control signals (e.g., Wysel<11:8>, Wysel<7:4>, and Wysel<3:0>). A more detailed example of the operation of the multiplexers 18a–18n may be found in U.S. Pat. No. 5,764,967, which is hereby incorporated by reference in its entirety.

The output path 16 may also comprise a number of latches 20a–20n. The latches may incorporate various functions such as mark, mark and retransmit, look-ahead, precharge, etc. Examples of such functions may be found in co-pending applications U.S. Ser. No. 08/991,845 entitled "HIGH SPEED FIFO RETRANSMIT SCHEME" (now U.S. Pat. No. 6,366,979) and U.S. Ser. No. 08/995,381 entitled "STAGGERED BITLINE PRECHARGE SCHEME" (now U.S. Pat. No. 6,023,435), which are each hereby incorporated by reference in their entirety.

The following TABLE 1 illustrates examples of the outputs the logic section 18 for operation in the "By-9 Little Endian Operation":

TABLE 1

| Clock | Dlat9 <15:0> | Dlat18 <3:0> | Dlat36 <11:0> | Ysel <63:32> | Ysel <31:0> |
|---|---|---|---|---|---|
| 0 | 0001 | 0 | 000 | 00000000 | 00000001 |
| 1 | 0002 | 0 | 000 | 00000000 | 00000010 |
| 2 | 0004 | 0 | 000 | 00000000 | 00000100 |
| 3 | 0008 | 0 | 000 | 00000000 | 00001000 |
| 4 | 0010 | 0 | 000 | 00000000 | 00010000 |
| 5 | 0020 | 0 | 000 | 00000000 | 00100000 |
| 6 | 0040 | 0 | 000 | 00000000 | 01000000 |
| 7 | 0080 | 0 | 000 | 00000000 | 10000000 |
| 8 | 0001 | 0 | 000 | 00000000 | 00000002 |
| 9 | 0002 | 0 | 000 | 00000000 | 00000020 |
| . | | | | | |
| . | | | | | |
| . | | | | | |
| 30 | 0040 | 0 | 000 | 00000000 | 08000000 |
| 31 | 0080 | 0 | 000 | 00000000 | 80000000 |
| 32 | 0100 | 0 | 000 | 00000001 | 00000000 |
| 33 | 0200 | 0 | 0 | 00000010 | 00000000 |

The following TABLE 2 illustrates examples of the outputs of the logic section 18 for operation in the "By-9 Big Endian Operation":

TABLE 2

| Clock | Dlat9 <15:0> | Dlat18 <3:0> | Dlat36 <11:0> | Ysel <63:32> | Ysel <31:0> |
|---|---|---|---|---|---|
| 0 | 0008 | 0 | 000 | 00000000 | 00001000 |
| 1 | 0004 | 0 | 000 | 00000000 | 00000100 |
| 2 | 0002 | 0 | 000 | 00000000 | 00000010 |
| 3 | 0001 | 0 | 000 | 00000000 | 00000001 |
| 4 | 0080 | 0 | 000 | 00000000 | 10000000 |
| 5 | 0040 | 0 | 000 | 00000000 | 01000000 |
| 6 | 0020 | 0 | 000 | 00000000 | 00100000 |
| 7 | 0010 | 0 | 000 | 00000000 | 00010000 |
| 8 | 0008 | 0 | 000 | 00000000 | 00002000 |
| 9 | 0004 | 0 | 000 | 00000000 | 00000200 |
| . | | | | | |
| . | | | | | |
| . | | | | | |
| 30 | 0020 | 0 | 000 | 00000000 | 00800000 |
| 31 | 0010 | 0 | 000 | 00000000 | 00080000 |
| 32 | 0800 | 0 | 000 | 00001000 | 00000000 |
| 33 | 0400 | 0 | 000 | 00000100 | 00000000 |

The following TABLE 3 illustrates examples of the outputs the logic section 18 for operation in the "By-18 Little Endian Operation":

TABLE 3

| Clock | Dlat9 <15:0> | Dlat18 <3:0> | Dlat36 <11:0> | Ysel <63:32> | Ysel <31:0> |
|---|---|---|---|---|---|
| 0 | 0001 | 0 | 001 | 00000000 | 00000011 |
| 1 | 0004 | 1 | 000 | 00000000 | 00001100 |
| 2 | 0010 | 0 | 008 | 00000000 | 00110000 |

TABLE 3-continued

| Clock | Dlat9 <15:0> | Dlat18 <3:0> | Dlat36 <11:0> | Ysel <63:32> | Ysel <31:0> |
|---|---|---|---|---|---|
| 3 | 0040 | 2 | 000 | 00000000 | 11000000 |
| 4 | 0001 | 0 | 001 | 00000000 | 00000022 |
| 5 | 0004 | 1 | 000 | 00000000 | 00002200 |
| . | | | | | |
| . | | | | | |
| . | | | | | |
| 14 | 0010 | 0 | 008 | 00000000 | 00880000 |
| 15 | 0040 | 2 | 000 | 00000000 | 88000000 |
| 16 | 0100 | 0 | 001 | 00000011 | 00000000 |
| 17 | 0400 | 1 | 000 | 00001100 | 00000000 |

The following TABLE 4 illustrates examples of the outputs of the logic section 18 for operation in the "By-18 Big Endian Operation":

TABLE 4

| Clock | Dlat9 <15:0> | Dlat18 <3:0> | Dlat36 <11:0> | Ysel <63:32> | Ysel <31:0> |
|---|---|---|---|---|---|
| 0 | 0004 | 1 | 000 | 00000000 | 00001100 |
| 1 | 0001 | 0 | 001 | 00000000 | 00000011 |
| 2 | 0040 | 2 | 000 | 00000000 | 11000000 |
| 3 | 0010 | 0 | 008 | 00000000 | 00110000 |
| 4 | 0004 | 1 | 000 | 00000000 | 00002200 |
| 5 | 0001 | 0 | 001 | 00000000 | 00000022 |
| . | | | | | |
| . | | | | | |
| . | | | | | |
| 14 | 0040 | 2 | 000 | 00000000 | 88000000 |
| 15 | 0010 | 0 | 008 | 00000000 | 00880000 |
| 16 | 0400 | 1 | 000 | 00001100 | 00000000 |
| 17 | 0100 | 0 | 001 | 00000011 | 00000000 |

The following TABLE 5 illustrates examples of the outputs the logic section 18 for operation in the "By-36 Operation":

TABLE 5

| Clock | Dlat9 <15:0> | Dlat18 <3:0> | Dlat36 <11:0> | Ysel <63:32> | Ysel <31:0> |
|---|---|---|---|---|---|
| 0 | 0001 | 0 | 007 | 00000000 | 00001111 |
| 1 | 0010 | 0 | 038 | 00000000 | 11110000 |
| 2 | 0040 | 2 | 000 | 00000000 | 00002222 |
| 3 | 0001 | 0 | 008 | 00000000 | 22220000 |
| 4 | 0001 | 0 | 007 | 00000000 | 00004444 |
| . | | | | | |
| . | | | | | |
| . | | | | | |
| 6 | 0001 | 0 | 007 | 00000000 | 00008888 |
| 7 | 0010 | 0 | 038 | 00000000 | 88880000 |
| 8 | 0100 | 0 | 1C0 | 00001111 | 00000000 |
| 9 | 1000 | 0 | E00 | 11110000 | 00000000 |

The datapath of the present invention may provide bus-matching while avoiding delays associated with an extra level of multiplexing, which may also save on chip area. Additionally, operation of the datapath may be simplified by implementing the present invention into existing datapath architecture as outlined in the referenced patent.

The present invention may also be implemented by multiplexing the data at other points in the datapath. However, such an alternate implementation may incur some extra delay and/or extra logic. The present invention may also be used to ease back-end testing by allowing a test engineer to test the entire memory using a 9-bit channel for the data input/output rather than 36 bit channels.

While the invention has been particularly shown and described with reference to the preferred embodiments thereof, it will be understood by those skilled in the art that various changes in form and details may be made without departing from the spirit and scope of the invention.

What is claimed is:

1. A circuit comprising:

one or more first data paths;

one or more second data paths; a first circuit configured to connect one or more of said first data paths to one or more of said second data paths in response to one or more first control signals;

a second circuit configured to transfer bytes of data between each of said one or more second data paths and one of a plurality of memory locations in response to one or more second control signals; and a logic circuit configured to generate said one or more first control signals and said one or more second control signals in response to a third control signal.

2. The circuit according to claim 1, wherein said first circuit comprises a plurality of transmission gates each configured to couple one of said first data paths and one of said second data paths in response to said one or more first control signals.

3. The circuit according to claim 1, wherein said second circuit comprises one or more multiplexers configured to couple said one or more second data paths and said plurality of memory locations in response to said one or more second control signals.

4. The circuit according to claim 3, wherein said second circuit further comprises one or more latches configured to couple said second data paths and said multiplexers.

5. The circuit according to claim 1, wherein said logic circuit is further configured to generate said one or more first and said one or more second control signals in response to a clock signal.

6. The circuit according to claim 1, wherein said first circuit is further configured to connect said one or more first data paths to a number of different ones of said one or more second data paths in response to said one or more first control signals.

7. The circuit according to claim 6, wherein said number of different connections correspond to one or more modes of operation.

8. The circuit according to claim 7, wherein each of said modes of operation correspond to a mode selected from the group consisting of a 9-bit Big Endian Write, a 9-bit Little Endian Write, a 18-bit Big Endian Write, a 18-bit Little Endian Write, a 36-bit Write, a 9-Bit Big Endian Read, a 9-bit Little Endian Read, a 18-bit Big Endian Read, a 18-bit Little Endian Read, a 36-bit Read and other data widths.

9. The circuit according to claim 7, wherein said one or more modes of operation comprise a test mode configured to read out in a 9-bit mode.

10. The circuit according to claim 1, wherein said one or more first data paths comprise an input data path.

11. The circuit according to claim 1, wherein said one or more first data paths comprise an output data path.

12. The circuit according to claim 1, wherein said first and said second data paths are coupled to a first in-first out (FIFO) buffer.

13. A circuit comprising:

means for generating one or more first control signals and one or more second control signals in response to a third control signal;

means for connecting one or more first data paths to one or more second data paths in response to said one or more first control signals; and means for transferring bytes of data between each of said one or more second data paths and one of a plurality of memory locations in response to said one or more second control signals.

14. A method for bus matching in a memory comprising the steps of:

(A) generating one or more first control signals and one or more second control signals in response to a third control signal;

(B) connecting one or more first data paths to one or more second data paths in response to said one or more first control signals; and (C) transferring bytes of data between each of said one or more second data paths and one of a plurality of memory locations in response to said one or more second control signals.

15. The circuit according to claim 8, wherein each of said modes of operation is selected in response to said third control signal.

16. The circuit according to claim 4, wherein said latches support one or more functions selected from the group consisting of mark, mark and retransmit, look-ahead, and precharge.

17. The circuit according to claim 1, wherein said circuit comprises a multi-port memory.

18. The circuit according to claim 1, wherein said circuit comprises a first in-first out (FIFO) buffer.

19. The circuit according to claim 1, further comprising:

a fourth circuit configured to connect one or more third data paths to one or more fourth data paths in response to one or more fourth control signals; and a fifth circuit configured to transfer bytes of data between each of said one or more fourth data paths and one of a plurality of memory locations in response to one or more fifth control signals, wherein said first and second data paths are configured for write operations and said third and fourth data paths are configured for read operations.

20. The method according to claim 14, further comprising the step of:

selecting a mode of operation corresponding to one of a 9-bit Big Endian Write, a 9-bit Little Endian Write, a 18-bit Big Endian Write, a 18-bit Little Endian Write, a 36-bit Write, a 9-Bit Big Endian Read, a 9-bit Little Endian Read, a 18-bit Big Endian Read, a 18-bit Little Endian Read, a 36-bit Read and other data widths in response to said third control signal.

* * * * *